April 12, 1927.  E. H. BRISTOL  1,624,887
MEASURING AND CONTROLLING INSTRUMENT
Filed Aug. 10, 1920   3 Sheets-Sheet 1

Inventor:
Edgar H. Bristol,
by Emery, Booth, Janney & Varney
Attys.

April 12, 1927.
E. H. BRISTOL
1,624,887
MEASURING AND CONTROLLING INSTRUMENT
Filed Aug. 10, 1920
3 Sheets-Sheet 2
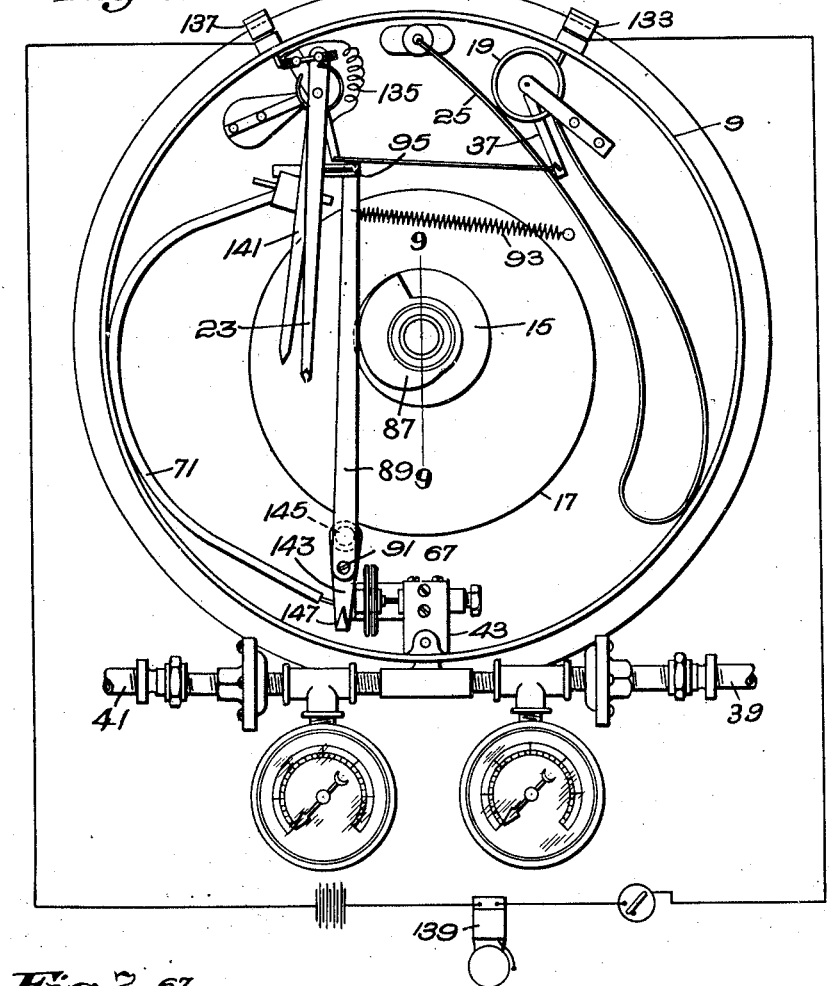
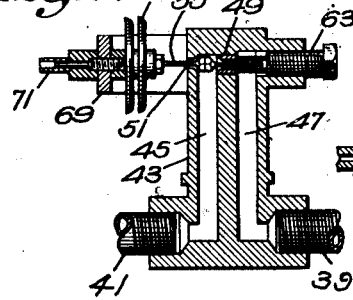
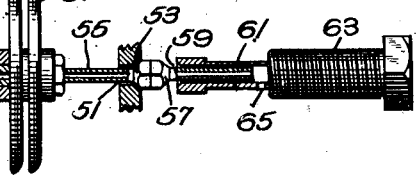
Inventor:
Edgar H. Bristol.
by Emery, Booth, Janney & Varney
Attys.

April 12, 1927.
E. H. BRISTOL
1,624,887
MEASURING AND CONTROLLING INSTRUMENT
Filed Aug. 10, 1920
3 Sheets-Sheet 3
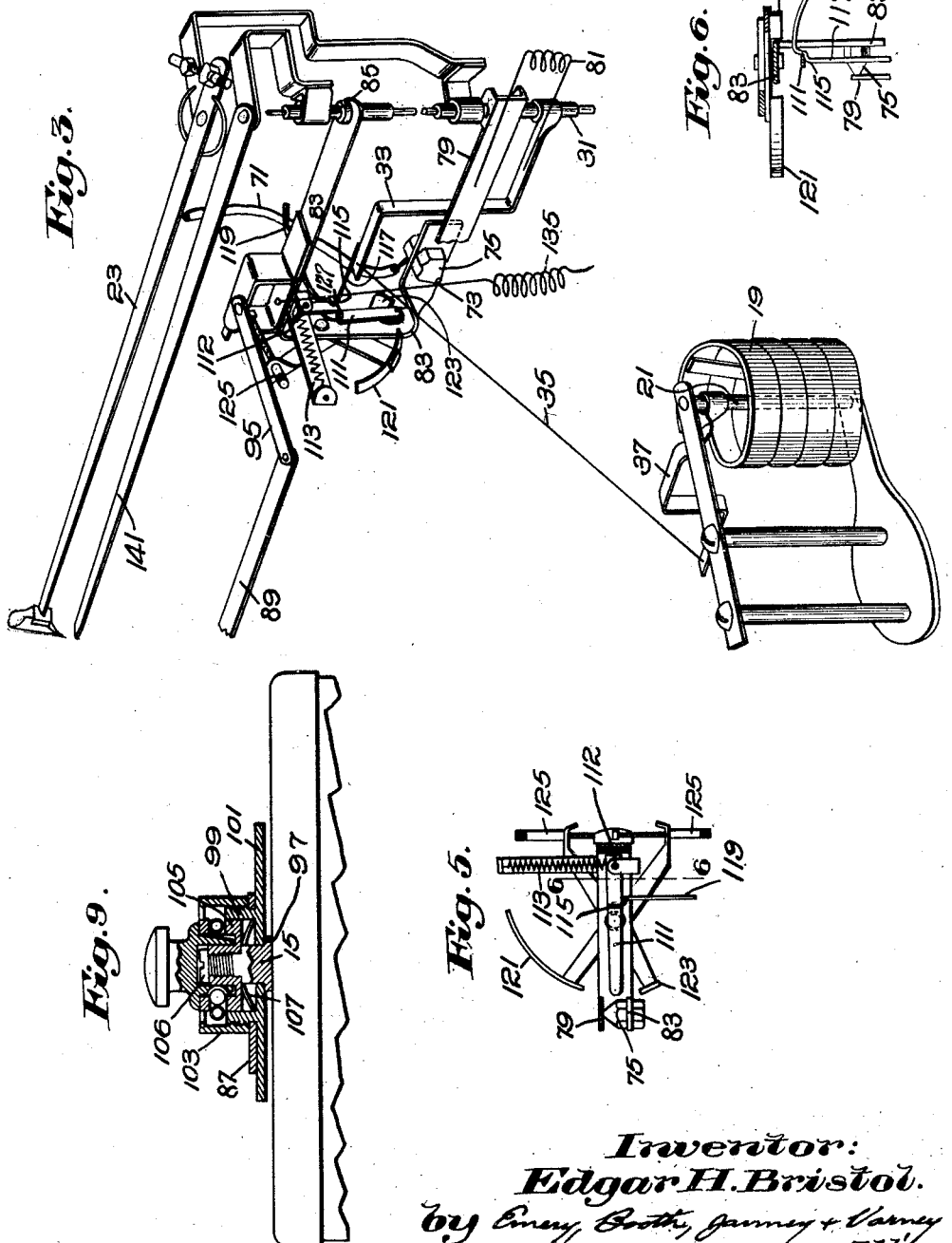
Inventor:
Edgar H. Bristol.
by Emery, Booth, Janney + Varney
Attys.

Patented Apr. 12, 1927.

1,624,887

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING AND CONTROLLING INSTRUMENT.

Application filed August 10, 1920. Serial No. 402,665.

This invention relates to automatic controlling instruments whereby conditions of temperature, pressure or the like may be automatically controlled in desired manner. In the example shown the instrument is also a measuring instrument providing for indication or recording of such conditions as they exist at a certain point and as they may be modified. Herein I have shown an instrument which controls the passage of fluid through a conduit, which fluid may either directly effect the conditions being measured or control the same through intermediate mechanisms. For definiteness I have chosen by way of example of my invention an instrument adapted to measure temperature conditions and in particular one measuring temperature by a suitable pressure sensitive device and recording the measurements on a suitable dial. An instrument performing these functions alone is commonly known as a recording thermometer or thermograph. The present device is also a controlling instrument and controls the passage of fluid through a conduit, the fluid in the example chosen being under positive pressure.

My invention will be best understood by reference to the following detailed description of the embodiment thereof referred to which is illustrated in the accompanying drawings, wherein:

Fig. 2 is a similar view of the same with the door and the front face removed to show the interior;

Fig. 3 is an enlarged perspective view of certain portions of the operating mechanism;

Fig. 5 is an elevation of a contact maker and cooperating contacts forming part of the mechanism;

Fig. 6 is a section on line 6—6 of Fig. 5;

Fig. 7 is a view in vertical section of a fitting of the pressure conduit and some of the controlling mechanism therefor;

Fig. 8 is a view on a still larger scale and with parts broken away of details of Fig. 7; and Fig. 9 is a section on the line 9—9 of Fig. 2 on an enlarged scale.

Figure 1:
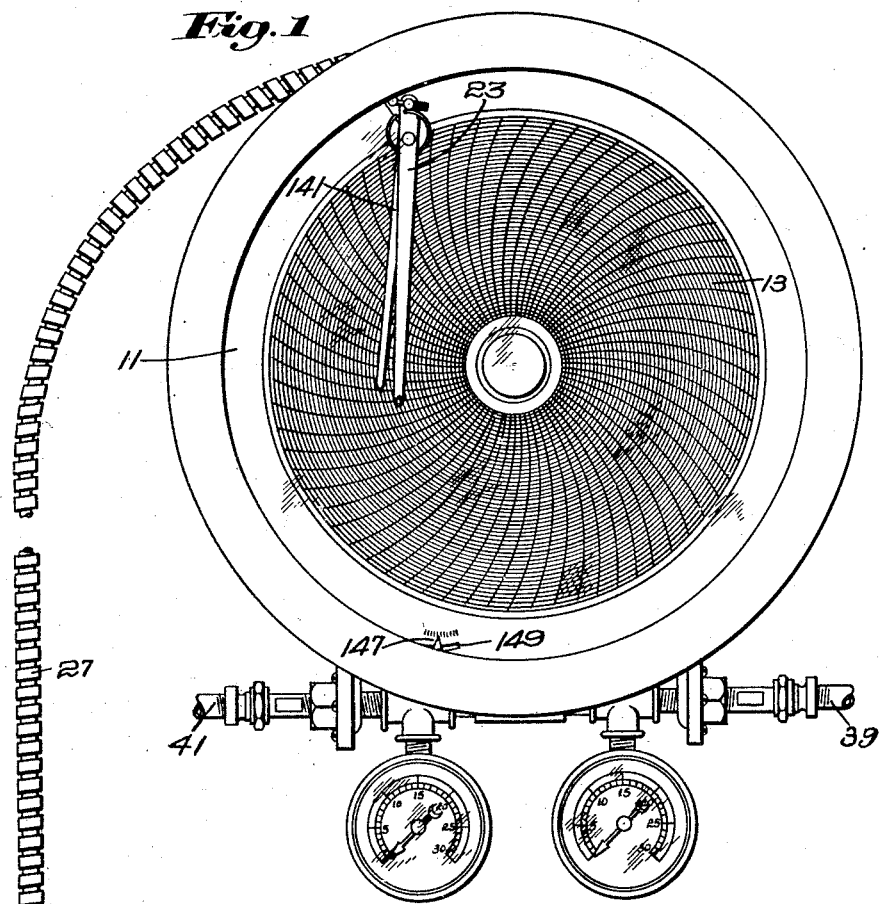
Fig. 1 is a front elevation of the instrument.

Referring to Figs. 1 and 2, the instrument shown embodies a suitable case 9, Fig. 2, the front of which may be covered by a glazed door 11, Fig. 1, through which is displayed the dial of the instrument, here shown as the usual removable polar chart 13 adapted to be rotated by the shaft 15 of a suitable time train, not herein shown in detail but of which the enclosing casing 17 appears in Fig. 2. The measuring element herein takes the form of a pressure sensitive device although other forms of responsive elements can be used. Herein I have shown a flat helical tube 19 (see Figs. 2 and 3) supported at one end and secured at its other end to a shaft 21 which is adapted to move, in the present instance by connections hereinafter to be described, the index or pen 23 which sweeps over the chart 13 marking the same in well known manner. The tube may be connected by a capillary pipe 25 conveniently protected by an armor 27 at the exterior of the casing with a bulb 29 adapted to be exposed to temperature conditions at the point which it is desired to measure them. It will be understood that the bulb 29, pipe 25 and tube 19 may be filled with fluid such as alcohol and that the changes of vapor tension caused by changes of temperature will distort the tube 19 and actuate the pen 23. As best shown in Fig. 3, the pen 23 may be mounted on a shaft 31 carrying a crank arm 33 connected by a connecting rod 35 to the parallel crank arm 37 on the shaft 21 moved by the sensitive tube 19.

The instrument here shown is adapted to control the passage of fluid under pressure from the pipe 39 to the pipe 41. In other words, in the embodiment of the invention illustrated, the flow of fluid which is to be controlled is from right to left viewing the drawings. It will be understood that the fluid flow may be utilized to control other mechanisms. For example, air under pressure may pass through the pipes 39 and 41 and operate a diaphragm motor valve of known type controlling the passage of steam or other heating medium to a chamber such as a vulcanizer. Herein communication is provided between pipes 39 and 41 by a fitting 43 secured to and extending into the instrument case. As best seen in Fig. 7, the fitting 43 provides a connection between the pipes 39 and 41 including parallel passages 45 and 47 and a connecting passage 49. The flow of fluid through these passages is controlled by valve mechanism shown in Figs. 7 and 8 and which I shall next describe.

In the passage 49 a port 51 is provided leading to the outer atmosphere within the casing 9, and this port is adapted to be sealed by a valve 53 carried by the tubular valve rod 55. Also carried by this valve 53 is a valve 57 adapted, when the valve 53 is withdrawn to the right away from its seat, to seat on a valve seat 59 herein shown as formed in the end of a sleeve 61 carried by a screw plug 63 and fitting the connecting passage 49. This sleeve also forms a guide for the valve carrying rod 55 as best seen in Fig. 8, the rod, however, fitting loosely therein to permit the passage of pressure fluid around the same from passage 47 through the opening or port 65 in the side of sleeve 61.

The hollow valve rod 55 is carried by and communicates with an expansible diaphragm 67 herein shown as supported by a bracket 69 extending from fitting 43. The parts are so designed that when the diaphragm 67 is in its normal condition it is under mechanical tension, the valve 53 is held seated and communication is open between pipes 39 and 41. As pressure fluid flows through the fitting 43, a certain amount will enter the hollow valve rod 55 at the right hand end, viewing Figs. 7 and 8, and is permitted to escape or bleed therethrough, through the diaphragm 67 and (see Figs. 2 and 3) through flexible connecting tube 71 and through an exhaust port 73 in a terminal member 75 to the atmosphere within the interior of casing 9. It will be understood that the passage through the valve rod 55 is so minute that the escape of pressure fluid does not materially affect the flow.

When it is desired to interrupt the flow of pressure fluid through the pipes 39 and 41, the exhaust port 73 may be closed by means hereinafter to be described. Pressure fluid entering through the valve carrying rod 55 cannot escape at 73 and will expand diaphragm 67, thus cutting off the passage 45 from the passage 47, interrupting the flow of pressure fluid to pipe 41 and relieving the existing pressure in the latter through port 51. The mechanism just described is substantially similar to that shown and described in my Patent No. 1,326,640, dated Dec. 30, 1919.

Figure 4:
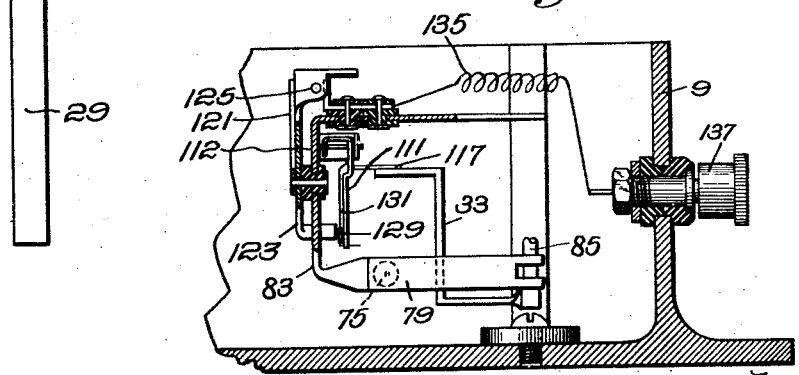
Fig. 4 is a partly broken view on an enlarged scale showing the electrical arrangement of parts of the operating mechanism.

I shall next describe the means herein utilized for controlling the motor diaphragm 67 and hence the valves 53 and 57. In the present embodiment of the invention the measuring tube 19 which measures the temperature is also used as a controlling device and provides for interrupting the flow of pressure fluid through pipes 39 and 41 when the temperature surrounding bulb 29 is at a certain point. Referring to Figs. 3 and 4, the port 73 and the member 75 may be closed by a valve conveniently in the form of a strip 79 loosely pivoted coaxially with the shaft 31 and normally pressed by a light spring 81 which connects said strip and the crank arm 33 toward the cooperating valve member 75 and into contact with a portion of the crank arm 33 which is moved by the sensitive tube 19. Assuming a given position for the valve element 75, if the temperature falls and the tube 19 contracts swinging the crank arm 37 counter-clockwise the crank arm 33 will move valve 79 away from the port in the cooperating valve member 75 and this will allow the flow of fluid to pipe 41. Through any suitable mechanism not here necessary to describe this effect may cause the operation of suitable means for causing heating to take place at the point to be measured. As the temperature rises again the crank arm 33 will move clockwise, permitting the valve 79 to be lowered against the valve element 75 to close the port and eventually to cut off the supply of heat. It will be noted that if the heat rises further beyond this point the crank arm 33 can move on as it has lost motion relative to the valve 79.

In the embodiment of the invention here shown I provide for an automatic control of the heat providing for different values thereof at different times. It will be understood from the description already given that if the valve element 75 occupies a given position, that position will correspond to a desired temperature at a chosen point which will be maintained substantially constant by the control of the heating instrumentalities through the instrument. If the position of one of the valve elements, for example the valve element 75, is shifted there is a corresponding change in value of the temperature at which the control mechanism takes effect. Herein I provide for more or less relative shifting of the elements of the valve couple throughout a time period so that the control of the instrument is a function of two variables, one temperature or pressure and the second time. The control of the instrument thus causes the temperature or pressure condition at a desired point to follow a desired time temperature curve. This is more fully discussed in my Patent No. 1,405,181, granted Jan. 31, 1922.

The control relative to time is herein effected by a shifting of the valve element 75 which for that purpose may be mounted on one leg of a U-shaped arm 83 pivoted by its other leg on shaft 85 coaxial with the shaft 31 and the bearing for the valve 79. Positioning of the valve element may be effected by a suitable cam 87 on the time shaft 15 which swings a lever 89 pivoted at 91 against the force of a spring 93 and which through a connecting link 95 swings the arm 83 about its axis.

As the arm 89 rides on the rise of the cam the valve element 75 is swung away from the cooperating valve 79 which is held by the crank arm 33 operated by the sensitive tube 19. Air exhausts through port 73 and heat is applied to the desired point. As the temperature rises to the point determined by the position of the valve element 75, the valve 79 is permitted to swing over because of movement of the restraining crank arm 33 by action of the increased temperature on the tube 19, the valve closes and the heating ceases. The heating effect may thus be gradually increased as a function of time, the nature of the time temperature curve depending on the contour of the cam.

Referring to Fig. 9, I have there shown in detail one suitable means for mounting the cam permitting easy change when desired. The time shaft 15 is provided with a shoulder 97 against which fits a hub member 99 having a flange 101. The cam 87 may be loosely received over the hub member and clamped against the flange 101 by the nut 103. A dial holder or chart carrier 105 which may be and preferably is of the type described in Patent No. 1,048,804 dated Dec. 31, 1912, is secured to the shaft 15 and received within the threaded surface of hub 99 serves as an axle nut for clamping the same. A screw 106 locks the chart carrier 105. A suitable spring washer 107 is preferably interposed between the chart carrier and the hub to cause the hub to rotate with the time shaft. The nut 103 surrounds the chart holder 105 and may be withdrawn over the same without disturbing it. This construction permits the cams to be readily changed and conveniently positioned as regards the time train and for easy relative adjustment of the cam and the chart.

In the present form of the invention means are provided to assure the accurate functioning of the instrument. Conveniently this takes the form of a mechanism electrically controlled and operated at times when the instrument is not functioning with desired accuracy. By way of example I here disclose an alarm to attract attention to the fact. It will be understood that in the operation of a device of this character one valve element as 79 follows the other element 75 very closely in its movement, the normal position of the parts being a slight separation. If the temperature does not rise according to the desired curve the valve element 79 will lag unduly far behind. Means may therefore be provided to give a signal on undue separation of these elements. On the other hand, if the temperature rises unduly the crank arm 33 by virtue of its lost motion connection with the valve 79 will swing clockwise away from the same, and a signal should therefore be given in this instance. In the present instance means are provided controlled by the position of the arm 33, that is to say, by the position of the tube 19 and ultimately by the temperature which is being measured, for closing an electric circuit when the position of this arm varies unduly relative to the position of the valve element 75, in other words, when the temperature being measured varies unduly from the set temperature for the given time. Referring to Fig. 3, there is there shown a contact maker in the form of a light arm 111 pivoted at 112 to the base or connecting portion of the U-shaped arm 83 and normally swung by a light spring 113 against a shoulder 115 at the extremity of a wire 117 carried by the crank arm 33, this wire extending from the shoulder in a long curved portion 119 for a purpose hereinafter to be described (see Figs. 5 and 6). Also carried by the arm 83 as shown in Fig. 5 and movable therewith by the time train are arc-shaped contacts 121 and 123, which may be formed on the end of arms pivoted to the base flange of the arm 83 and adjustable by screws 125 to bring them nearer or further away from the normal medial position of the contact maker 111, which is in parallelism with the shaft 85. During normal operation of the instrument when the valve 79 is in contact with the arm 33 and either in contact with the cooperating valve element 75 or but slightly distant therefrom, the contact maker 111 which is positioned by the arm 33 lies between the two arc-shaped contacts which are positioned by the arm 83 carrying the valve 75, the distance between these contacts providing a certain freedom of movement for the contact maker 111 corresponding to the desired permissible range of movement between the elements of the valve couple 75 and 79. If the temperature lags, however, and the valve element with the contacts moves clockwise viewing Figs. 3 and 5 without corresponding movement of the arm 33, the contact maker will be held back by the shoulder 115 of the wire attached to this arm, the fulcrum 112, however, moving on with the arm 83 and the contact maker will be swung into contact with the arc-shaped contact 121, thus closing an electric circuit and either sounding an alarm, or operating suitably relay mechanism for correcting the undue conditions. On the other hand, if the temperature rises too fast the fulcrum of the contact maker will remain stationary, relatively speaking, and the arm 33 will move clockwise releasing the contact maker to the action of the spring 113 and it will swing over on to the arc-shaped contact 123 with similar results. In the former instance as the temperature falls the curved extension 119 of the wire will ride under the shoulder 127 on the contact maker and sustain the same and prevent it from falling over on the opposite side of the wire. Referring to Figs. 2 and 4, the contact arm 111 which has a suitable brush 129 supported on a bowed wire 131 may be grounded to the case of the instrument which is provided with a ground terminal 133. The arc-shaped contacts 121 and 123 on the other hand are insulated as indicated by Fig. 4 and connected by wire 135 to the insulated terminal 137. To these terminals are connected the wires of the circuit of the alarm bell 139, Fig. 2, or other electrically operated or controlled mechanism.

In Fig. 3 there is shown a pointer 141 carried by the shaft 85 on which is mounted the arm 83 which carries the contacts and the valve element 75. This pointer extends over the chart 13 as shown in Fig. 1 and gives a visual indication of the position of the valve element 75 in comparison with the indication afforded by the pen 23 which shows the position of the valve element 79 as positioned by crank arm 33 on the shaft 31 which carries the pen 23. In Figs. 1 and 3 for clearness the pointer 141 is shown much further removed from the pen 23 than would be the case in practice since, as has been explained, the valve elements 75 and 79 are in the normal operation of the instrument very close to one another.

The path of the pointer 141 on the chart is a curve indicating the controlling action of the instrument. To cause this curve to follow or coincide with the temperature curve an adjustment is preferably provided to alter the positions of the valve element 75 between which it is moved by the cam 87. Referring to Fig. 2, this is provided for in the present embodiment of the invention by an adjustment of the pivotal point 91 of lever 89.

Herein the pivot 91 is disposed eccentrically on a swinging lever 143 pivoted to a pillar 145. By swinging lever 143 the position of pivot 91 is adjusted and consequently the position of the valve element 75. Within the limits of the adjustment, therefore, the position of the valve element corresponding to a certain point on the cam may be adjusted to correspond with a desired temperature. The lever 143 may have a rebent end 147 adapted to project through a slot 149 in the face of the instrument as shown in Fig. 1, this end forming a pointer adapted to cooperate with a suitable scale as shown.

I have described in detail the particular embodiment of my invention shown by way of example in the accompanying drawings. The principles exemplified thereby which I claim as new and desire to secure by Letters Patent I shall express in the following claims:—

1. An instrument of the class described having means for controlling the flow of fluid as a function of both time and temperature variables and including a thermosensitive device and an electric mechanism having a circuit closed under the control of said sensitive device when the actual temperature varies by at least a predetermined amount from the desired value corresponding to a given time value.

2. An instrument of the class described having means for controlling the flow of fluid as a function of both time and temperature variables and including alarm means operating when the actual temperature varies by at least a predetermined amount from the desired value corresponding to a given time value.

3. An instrument of the class described comprising controlling means including a pair of valve elements, means for moving one in accordance with a pressure variable, means for relatively positioning the two in accordance with another variable and signal means operated on predetermined separation of said elements.

4. An instrument of the class described comprising controlling means including a pair of valve elements, means for moving one in accordance with a pressure variable, means for relatively positioning the two in accordance with another variable, electric contacts moved in accordance with said variables and normally separated at such values thereof which maintain the valve elements in close proximity.

5. An instrument of the class described comprising controlling means including a variably positionable valve element, a cooperating valve element, pressure responsive means operatively related thereto to control movement of the same and signal means operated on predetermined separation of said elements.

6. An instrument of the class described comprising controlling means including a variably positionable valve element, a cooperating valve element, pressure responsive means operatively related thereto to control movement of the same and providing for closing of the valve at a given pressure value for a given position of the first element and signal means operated when said pressure responsive means responds to a predetermined different value.

7. An instrument of the class described comprising controlling means including a valve element, means for positioning the same, an electric contact adjacent thereto and moved therewith, a cooperating valve element, pressure responsive means controlling the movement thereof and a cooperating movable contact also controlled in its movement by said pressure responsive means.

8. An instrument of the class described comprising controlling means including a valve element, time controlled means for positioning the same, an electric contact adjacent thereto and moved therewith, a cooperating valve element, pressure responsive means controlling the movement thereof and a cooperating movable contact also controlled in its movement by said pressure responsive means.

9. An instrument of the class described comprising controlling means including a shiftable valve element, electrical contacts on either side thereof, a swinging contact arm between them, a cooperative valve element and temperature responsive means controlling movement of said cooperating element and also of said arm.

10. An instrument of the class described comprising a valve element, electrical contacts adjustably positioned adjacent said element on either side thereof, a swinging contact arm pivoted to lie between said contacts, means for moving said element, contacts and arm as a unit, a cooperating valve element and temperature responsive means controlling movement of said latter element and of said arm.

11. An instrument of the class described comprising controlling means including a valve element, an electrical contact definitely positioned with respect thereto, a movable contact arm to cooperate with said contact, said element, contact and arm variably positionable as a unit, a cooperating valve element and pressure responsive means controlling movement of said latter element and of said arm.

12. An instrument as defined in claim 11 wherein time controlled means serve for variably positioning the element, contact and arm.

13. In a structure of the class described, in combination with the swinging contact maker 111 having a transverse shoulder, means for moving the same having a shoulder engaging one side of the arm and a long extension adjacent said latter shoulder to underride the transverse shoulder and support the arm after movement of the same.

14. In an instrument of the class described a valve element, a cooperating valve element comprising a pivoted spring pressed arm normally pressed toward the first, a swinging arm member engaging one side of said first arm, a pressure responsive element and a connecting rod between said element and said second arm.

15. In an instrument of the class described a valve element, a cooperating valve element comprising a pivoted spring pressed arm normally pressed toward the first, a swinging arm member engaging one side of said first arm and a pressure responsive device in the form of a helical tube connected to said second arm to swing the same.

16. An instrument of the class described comprising controlling means including a valve element, a swinging arm supporting the same, a cam having time-train driving means for moving the arm, a cooperating valve element arranged to swing about the same axis as the arm, a spring to move the same in one direction, a crank arm rotatable on said axis having a portion engaging said element to move the same in the other direction and a pressure responsive device for actuating said crank arm.

17. An instrument of the class described comprising controlling means including a valve element, a pivoted arm spring pressed toward the same and providing a cooperating valve element, parallel cranks and a connecting rod between them, pressure responsive means for moving one crank, the other crank being positioned to make contact with a side of said arm.

18. An instrument of the class described comprising controlling means including a valve element, a swinging arm supporting the same, a cam having time-train driving means for moving the arm, a cooperating valve element arranged to swing about the same axis as the arm and a pressure responsive device operatively connected to the latter valve element.

19. An instrument of the class described comprising controlling means including a valve element, a swinging arm supporting the same, a cam having time-train driving means, an arm oscillated thereby and connected to said first arm, a cooperating valve element arranged to swing about the same axis as the first arm and a pressure responsive device operatively connected to the latter valve element.

20. A combined recording and controlling instrument comprising a clock movement having a shaft, a dial plate rotatable thereby, a pen, a pressure responsive member moving the same, governing mechanism including a valve element operated by said member, a cooperating valve element and a cam on the time shaft for positioning said latter element.

21. In a combined recording and controlling instrument as described, a time shaft, a hub thereon, a dial holder serving as an axle nut for said hub, a cam fitting over said hub and a nut for clamping the cam to the hub.

22. In a combined recording and controlling instrument as described, a time shaft, a hub thereon, a dial holder serving as an axle nut for said hub, a spring washer between said holder and hub, a cam fitting over said hub and a nut for clamping the cam to the hub.

23. A combined recording and controlling instrument comprising a clock movement having a shaft, a dial plate rotatable thereby, a pressure responsive member adjacent the circumference of the dial, a pen moved by said member to sweep outwardly from the center of the dial, governing mechanism including a valve element operated by said member, a cam on the time shaft, a motion transmitting device movable by said cam and a second cooperating valve element positioned by said device.

24. A combined recording and controlling instrument comprising a clock movement having a shaft, a dial plate rotatable thereby, a pressure responsive member adjacent the circumference of the dial, a pen moved by said member to sweep outwardly from the center of the dial, governing mechanism including a valve element operated by said member, a cam on the time shaft, a motion transmitting device movable by said cam, a second cooperating valve element adjacent said pressure responsive member, a hand movable therewith pivoted substantially coaxially of the pen and cooperating with the dial to indicate the position of said second valve element, said second valve element being positioned by said device.

25. An instrument of the class described comprising controlling means including a pair of valve elements, a pressure sensitive device for moving one of the elements and means for relatively positioning the elements including a cam and a lever moved thereby having an adjustable pivot.

26. An instrument of the class described comprising controlling means including a pair of valve elements, a pressure sensitive device for moving one of the elements and means for relatively positioning the elements including a cam, a lever moved thereby and a swingable support on which the lever is eccentrically pivoted.

27. An instrument of the class described comprising controlling means including a pair of valve elements, a pressure sensitive device for moving one of the elements and means for relatively positioning the elements including a cam and motion transmitting means operated by the cam adjustable to alter the positions of the element which is moved thereby.

28. A combined recording and controlling instrument comprising a clock movement having a shaft, a dial plate rotatable thereby, a pressure responsive member adjacent the circumference of the dial, a pen moved by said member to sweep outwardly from the center of the dial, governing mechanism including an element operated by said member, a cam on the time shaft, a motion transmitting device movable by said cam and a second element cooperating with the first and positioned by said device.

29. An instrument of the class described comprising controlling means including a variably positionable control element, a cooperating control element adapted to be brought into contact therewith to effect the desired action, pressure responsive means operatively related to said second element to control movement of the same and providing for the contact of said elements at a given pressure value for a given position of the first element and signal means operated when said pressure responsive means responds to a predetermined different value.

30. An instrument of the class described comprising controlling means including a shiftable control element, electrical contacts on either side thereof, a contact maker moving between them, a cooperating control element adapted to contact with the first to effect the desired action and pressure responsive means controlling movement of said second element and also of said contact maker.

31. An instrument of the class described comprising a control element, an electrical contact adjacent the same, a contact maker pivoted adjacent said contact, means for moving said element, contact and contact maker as a unit, a second control element adapted to engage the first to effect the desired action and pressure responsive means controlling movement of said latter element and of said contact maker.

32. An instrument of the class described comprising controlling means including a pair of control elements adapted one to engage the other to effect the desired action, a pressure sensitive device for moving one of the elements and means for relatively positioning the elements including a cam and motion transmitting means operated by the cam adjustable to alter the positions of the element which is moved thereby.

33. An instrument of the class described comprising controlling means including a swingable arm carrying a valve element, a second arm pivoted on the same axis, a cooperating valve element arranged to be moved in one direction by said arm but having lost motion relative thereto in the other direction, a pressure sensitive device for moving the second arm, the whole constituting a device wherein adjustment of the control may be effected by an angular movement of the first arm equal to the known angular movement effected by the pressure sensitive device under a given variation in pressure.

34. An instrument of the class described comprising controlling means including a swingable arm carrying a valve element, a cooperative valve element pivoted on the same axis and normally spring pressed toward the first, a second arm likewise pivoted on the same axis and engaging one side of said latter element and a pressure responsive device for moving the second arm, the whole constituting a device wherein adjustment of the control may be effected by an angular movement of the first arm equal to the known angular movement effected by the pressure sensitive device under a given variation in pressure.

35. A combined controlling instrument and gage comprising a pressure sensitive element, an index moved thereby, a scale with which the index cooperates, a mechanism comprising a first control element and a second control element normally spring pressed toward the first and adapted to cooperate therewith to effect the desired action and means connecting said pressure sensitive element to said second control element to move it in one direction against the spring and having lost motion with respect thereto in the other direction.

36. A combined controlling instrument and gage comprising a pressure sensitive element, an index moved thereby, a scale with which the index cooperates, a mechanism comprising a first control element and a second control element and means connecting said second element to said pressure sensitive device to be moved thereby permitting continued movement of the latter independent of the former after the control elements are engaged.

37. A combined controlling instrument and gage comprising a pressure sensitive element, an index moved thereby, a scale with which the index cooperates, a controlling valve comprising a first valve element and a second valve element normally tending to seat relatively to the first and means connecting said second element to said pressure sensitive device to be moved thereby permitting continued movement of the latter independent of the former after the seating.

38. A time and pressure control instrument comprising a pressure responsive device, a mechanism including control elements adapted to engage one with the other to effect the desired action and a clock movement, an enclosing casing for said parts including a front plate through which the time shaft on the clock movement projects, means for positioning one of said control elements governed by the pressure responsive device, an edge cam on the time shaft for moving the other element and a member connected to said element, extending inwardly over the face plate and by the movement of the end thereof relatively to the center defined by said shaft visually manifesting the position of said element under control of the cam whereby the controlling pressure may be read in the manner familiar in the reading of recording instruments.

In testimony whereof, I have signed my name to this specification.

EDGAR H. BRISTOL.